United States Patent
Kim et al.

(10) Patent No.: US 10,891,180 B2
(45) Date of Patent: Jan. 12, 2021

(54) MULTIPLE-PROCESSOR ERROR DETECTION SYSTEM AND METHOD THEREOF

(71) Applicant: HYUNDAI AUTRON CO., LTD., Seoul (KR)

(72) Inventors: Kee Beom Kim, Seongnam-si (KR); Young Suk Kim, Yongin-si (KR)

(73) Assignee: HYUNDAI AUTRON CO., LTD., Seoul (KR)

(*) Notice: Subject to any disclaimer, the term of this patent is extended or adjusted under 35 U.S.C. 154(b) by 140 days.

(21) Appl. No.: 16/189,980

(22) Filed: Nov. 13, 2018

(65) Prior Publication Data
US 2019/0155679 A1 May 23, 2019

(30) Foreign Application Priority Data
Nov. 23, 2017 (KR) .................. 10-2017-0157535

(51) Int. Cl.
*G06F 11/00* (2006.01)
*G06F 11/07* (2006.01)
*G06F 11/30* (2006.01)

(52) U.S. Cl.
CPC ........ *G06F 11/0772* (2013.01); *G06F 11/076* (2013.01); *G06F 11/0757* (2013.01); *G06F 11/3024* (2013.01)

(58) Field of Classification Search
CPC ............. G06F 11/0766; G06F 11/0769; G06F 11/0772; G06F 11/0775; G06F 11/0781; G06F 11/0784; G06F 11/321; G06F 11/322; G06F 11/326; G06F 11/327
USPC .......................................................... 714/57
See application file for complete search history.

(56) References Cited

U.S. PATENT DOCUMENTS

| | | | | |
|---|---|---|---|---|
| 8,819,313 | B1* | 8/2014 | Walther | G08G 1/097 709/208 |
| 2006/0229777 | A1* | 10/2006 | Hudson | G05B 23/021 701/31.4 |
| 2007/0124113 | A1* | 5/2007 | Foslien | G05B 23/024 702/185 |
| 2007/0283188 | A1* | 12/2007 | Balzer | F02D 11/107 714/26 |
| 2010/0050024 | A1* | 2/2010 | Covalenco | G01R 31/50 714/47.2 |

(Continued)

FOREIGN PATENT DOCUMENTS

KR 10-0458056 B1 6/2005
KR 10-2014-0134376 A 11/2014

*Primary Examiner* — Sarai E Butler
(74) *Attorney, Agent, or Firm* — Morgan, Lewis & Bockius LLP

(57) ABSTRACT

Provided is an error detection system including: an input unit for setting a system operation request time based on an external input; a plurality of processors for performing a predetermined operation; and an error detection processor for detecting an error of each of the plurality of processors. The error detection processor transmits an error detection signal to a predetermined first processor of the plurality of processors, receives an updated error detection signal from a predetermined second processor among the plurality of processors, and determines whether the operation processing time of the plurality of processors is processed within the operation request time based on the updated error detection signal.

20 Claims, 4 Drawing Sheets

(56) References Cited

U.S. PATENT DOCUMENTS

2013/0111276 A1* 5/2013 Terayama ........... G06F 11/2236
 714/49
2013/0339791 A1* 12/2013 Hamada .............. G06F 11/0724
 714/31

* cited by examiner

MULTIPLE-PROCESSOR ERROR DETECTION SYSTEM AND METHOD THEREOF

CROSS-REFERENCE TO RELATED APPLICATION

This application claims priority to Korean Patent Application No. 10-2017-0157535 filed on Nov. 23, 2017, and all the benefits accruing therefrom under 35 U.S.C. § 119, the contents of which are incorporated by reference in their entirety.

BACKGROUND

The present invention relates to a multiple-processor detection system and a method thereof, and more particularly, to a multiple-processor detection system and method for detecting errors and causes of errors in a plurality of processors.

The WatchDog Timer (WDT) is an electronic timer used to detect and recover from computer malfunctions. To prevent time elapsing or timeout, the computer system in normal operation restarts the WDT regularly.

When the computer fails to restart the WDT due to a hardware defect or a program error, the timer generates a timeout signal over time. This timeout signal is used to take several corrective actions. This corrective action generally involves keeping the computer system in a safe state and restoring it to normal operation.

The WDT is commonly found in computer control equipment, which is difficult for humans to access or respond to errors in a timely manner. When the software stops, many embedded systems may not rely solely on rebooting by a user. Therefore, these embedded systems must be self-supporting. For example, remote embedded systems such as space explorers may not be physically accessed by human operators. When the system may not automatically recover the errors, they may be permanently corrupted. The WDT is usually used in such cases.

FIG. 1 shows a block diagram of a conventional error detection system of a processor.

In the past, in order to monitor the normal operation of the processing core (or processor), the WDT is variably set in the watchdog processor 200, and upon receiving the WDT pulse signal from the processing core 100 within the corresponding time, it is determined that there is no problem in the operation of the processing core 100.

When the WDT pulse signal is not received from the processing core 100 within the time set in the WDT, the watchdog processor 200 resets the processing core 100. In the conventional error detection technology for the processing core 100, it is impossible to grasp which core has a problem in a multicore system.

In addition, in conventional multi-core systems with a watchdog processor and any number of processors, the watchdog processor performs operations to monitor other processors. However, when errors occur in particular processor, the error detection technique is not able to grasp the specific cause of error occurrence. For example, a watchdog processor may not determine whether an error that occurs on a particular processor is an arithmetic error or a communication error.

SUMMARY

The present invention provides a multiple-processor detection system and method for detecting errors and causes of errors of each of a plurality of processors, and a computer-readable recording medium having recorded thereon a program for executing the method.

In accordance with an embodiment, an error detection system includes: an input unit for setting a system operation request time based on an external input; a plurality of processors for performing a predetermined operation; and an error detection processor for detecting an error of each of the plurality of processors, wherein the error detection processor transmits an error detection signal to a predetermined first processor of the plurality of processors, receives an updated error detection signal from a predetermined second processor among the plurality of processors, and determines whether the operation processing time of the plurality of processors is processed within the operation request time based on the updated error detection signal.

When the operation processing time is not processed within the operation request time, the error detection processor may increment an error counter by a predetermined value and transmit an error occurrence signal to at least one of the plurality of processors when the error counter exceeds a predetermined threshold.

The operation processing time may be a sum of an operation performance consumed time of each of the plurality of processors and a communication time from the error detection signal transmission time point to the updated error detection signal reception time point.

When the error is based on the operation performance consumed time, the error counter may be a value obtained by weighting the predetermined value.

When the error is based on the communication time, the error counter may be a value obtained by weighting the predetermined value.

The operation processing time may be a sum of a value obtained by assigning a predetermined weight to an operation performance consumed time of each of the plurality of processors and a communication time from the error detection signal transmission time point to the updated error detection signal reception time point.

The operation processing time may be a sum of an operation performance consumed time of each of the plurality of processors and a value obtained by assigning a predetermined weight to a communication time from the error detection signal transmission time point to the updated error detection signal reception time point.

The updated error detection signal may include the operation performance consumed time recorded by each of the plurality of processors.

The operation performance consumed time may be a value obtained by measuring a difference between a time point at which a predetermined operation is started in each of the plurality of processors and a time point at which the predetermined operation is completed.

The error occurrence signal may include a signal including a flag value indicating an error occurrence and a reset signal.

The error detection system may further include a bus interconnecting the plurality of processors and the error detection processor.

In accordance with another embodiment, an error detection method includes: setting a system operation request time based on an external input; transmitting an error detection signal to a predetermined first processor by an error detection processor; performing a predetermined operation by each of the plurality of processors; updating an error detection signal by each of the plurality of processors; receiving an updated error detection signal from a predetermined second processor among the plurality of processors by an error detection processor; and determining whether the operation processing time of the plurality of processors is processed within the operation request time based on the updated error detection signal by an error detection processor.

The method may further include: when the operation processing time is not processed within the operation request time, incrementing an error counter by a predetermined value; and when the error counter exceeds a predetermined threshold, transmitting an error occurrence signal to at least one of the plurality of processors.

The operation processing time may be a sum of an operation performance consumed time of each of the plurality of processors and a communication time from the error detection signal transmission time point to the updated error detection signal reception time point.

When the error is based on the operation performance consumed time, the error counter is a value obtained by weighting the predetermined value.

When the error is based on the communication time, the error counter may be a value obtained by weighting the predetermined value.

The operation processing time may be a sum of a value obtained by assigning a predetermined weight to an operation performance consumed time of each of the plurality of processors and a communication time from the error detection signal transmission time point to the updated error detection signal reception time point.

The operation processing time may be a sum of an operation performance consumed time of each of the plurality of processors and a value obtained by assigning a predetermined weight to a communication time from the error detection signal transmission time point to the updated error detection signal reception time point.

The updated error detection signal may include the operation performance consumed time recorded by each of the plurality of processors.

The operation performance consumed time may be a value obtained by measuring a difference between a time point at which a predetermined operation is started in each of the plurality of processors and a time point at which the predetermined operation is completed.

The error occurrence signal may include a signal including a flag value indicating an error occurrence and a reset signal.

The plurality of processors and the error detection processor may be interconnected by a bus.

BRIEF DESCRIPTION OF THE DRAWINGS

Embodiments can be understood in more detail from the following description taken in conjunction with the accompanying drawings, in which.

DETAILED DESCRIPTION

Figure 1:
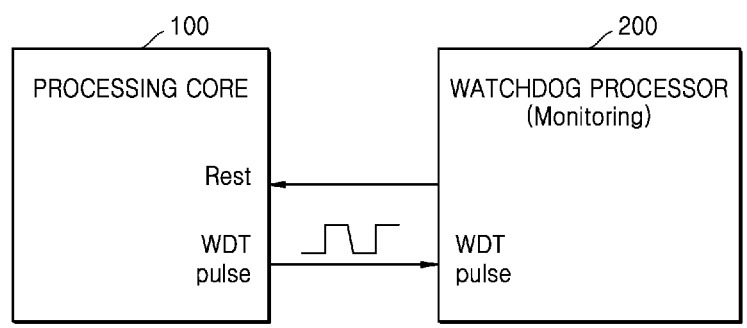
FIG. 1 shows a block diagram of a conventional error detection system of a processor.

Hereinafter, a preferred embodiment of the present invention will be described in detail with reference to the accompanying drawings. In the drawings, like reference numerals refer to like elements, and the size of each component in the drawings may be exaggerated for clarity of explanation.

Figure 2:
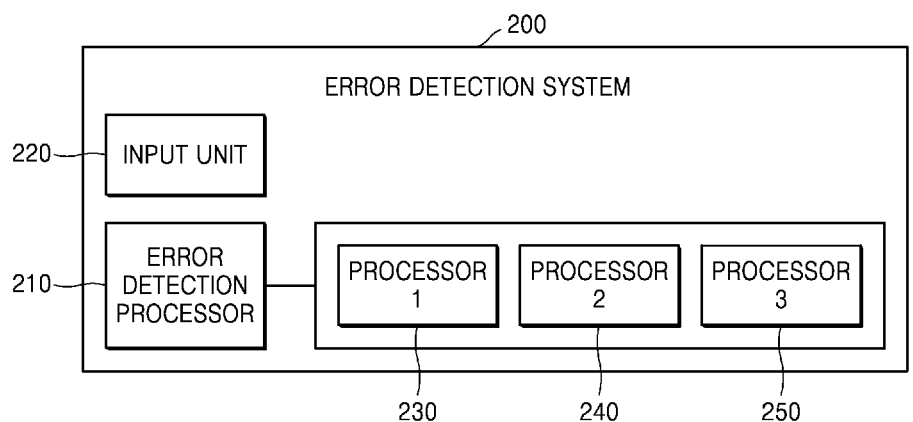
FIG. 2 is a block diagram of a multiple-processor detection system according to an embodiment of the present invention.

FIG. 2 is a block diagram of a multiple-processor detection system according to an embodiment of the present invention.

The error detection system 200 according to an embodiment of the present invention includes an input unit 220, an error detection processor 210, and a plurality of processors 230 to 250.

The error detection system 200 according to an embodiment of the present invention further includes a bus interconnecting the plurality of processors 230 to 250 and the error detection processor 210.

The input unit 220 sets the system operation request time based on the external input.

Each of the plurality of processors 230 to 250 performs a predetermined operation.

The error detection processor 210 detects an error of each of the plurality of processors 230 to 250. Specifically, the error detection processor 210 transmits an error detection signal to a predetermined first processor among the plurality of processors 230 to 250.

The predetermined first processor performs a predetermined operation and updates an error detection signal to include an operation performance consumed time required to perform a predetermined operation. The operation performance consumed time refers to a value measured as a difference between a time point at which a predetermined operation is performed in each of the plurality of processors 230 to 250 including the predetermined first processor and a time point at which the predetermined operation is completed.

The plurality of processors 230 to 250 sequentially perform the above-described predetermined operation and update an error detection signal.

The error detection processor 210 receives an updated error detection signal from a predetermined second processor of the plurality of processors 230 to 250. The updated error detection signal includes each operation performance consumed time recorded by each of the plurality of processors 230 to 250.

The error detection processor 210 determines whether the operation processing time of the plurality of processors 230 to 250 is processed within the operation request time based on the updated error detection signal. The operation processing time means that the operation performance consumed time of each of the plurality of processors 230 to 250 and the communication time from the error detection signal transmission time point to the updated error detection signal reception time point are added.

When the operation processing time is not processed within the operation request time, the error detection processor 210 increments the error counter by a predetermined value. When the error counter exceeds a predetermined threshold, the error detection processor 210 transmits an error occurrence signal to at least one that caused the error of the plurality of processors 230 to 250. The error occurrence signal includes a signal including a flag value indicating an error occurrence and a reset signal.

When the error detection system 200 according to an embodiment of the present invention is a system in which operation speed is important and the operation processing time is not processed within the operation request time due to the operation performance consumed time, the error detection processor 210 increments the error counter by weighting the predetermined value.

When the error detection system 200 according to an embodiment of the present invention is a system in which communication speed is important and the reason why the operation processing time is not processed within the operation request time is an error based on the communication time, the error detection processor 210 increments the error counter by weighting the predetermined value.

When the error detection system according to another embodiment of the present invention is a system in which operation speed is important, the error detection processor calculates an operation processing time by adding a value obtained by adding a predetermined weight to the operation performance consumed time of each of the plurality of processors and a communication time from the error detection signal transmission time point to the updated error detection signal reception time point. When the operation processing time is not processed within the operation request time, the error detection processor increments the error counter by a predetermined value. When the error counter exceeds a predetermined threshold, the error detection processor transmits an error occurrence signal to at least one that caused the error of the plurality of processors. The error occurrence signal includes a signal including a flag value indicating an error occurrence and a reset signal.

When the error detection system according to another embodiment of the present invention is a system in which communication speed is important, the error detection processor calculates the operation processing time by adding a value obtained by assigning a predetermined weight to the communication time from the error detection signal transmission time point to the updated error detection signal reception time point and the operation performance consumed time of each of the plurality of processors. When the operation processing time is not processed within the operation request time, the error detection processor increments the error counter by a predetermined value. When the error counter exceeds a predetermined threshold, the error detection processor transmits an error occurrence signal to at least one that caused the error of the plurality of processors. The error occurrence signal includes a signal including a flag value indicating an error occurrence and a reset signal.

Figure 3:
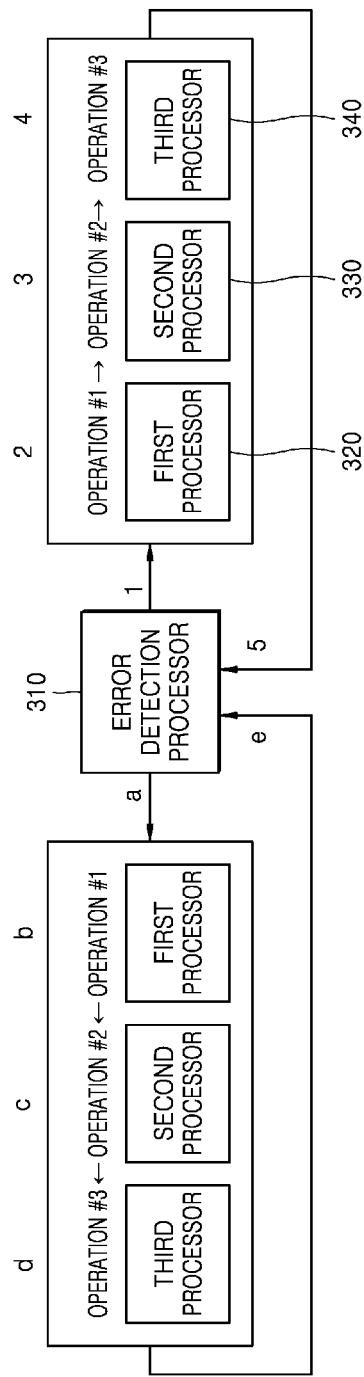
FIG. 3 shows the operation of a multiple-processor detection system according to an embodiment of the present invention.

FIG. 3 shows the operation of a multiple-processor detection system according to an embodiment of the present invention.

In the illustrated example, the error detection system includes an error detection processor 310 and three processors 320 to 340. Although three processors are shown in the illustrated example, it will be apparent to those skilled in the art that the error detection system may include any number of processors depending on the system design.

The error detection processor 310 according to an embodiment of the present invention transmits an error detection signal to the first processor 320. The error detection signal is generated through a method of using a "reserved" area of a predetermined communication data protocol, using data bits in a predetermined communication data protocol, adding some bits to a predetermined communication data protocol, or assigning additional pins to the error detection system.

The first processor 320 according to an embodiment of the present invention performs operation #1, which is a predetermined operation. First processor 320 updates the error detection signal to include an operation performance consumed time 2, which is required to perform operation #1. The operation performance consumed time 2 is a value obtained by measuring a difference between a time point at which the first processor 320 starts to perform operation #1 and a time point at which operation #1 is completed. The first processor 320 transmits the updated error detection signal to the second processor 330.

The second processor 330 and the third processor 340 according to an embodiment of the present invention update each error detection signal to perform a predetermined operation and each operation performance, as described above, and include the operation performance consumed times 3 and 4.

The third processor 340 transmits the updated error detection signal to the error detection processor 310.

The error detection processor 310 receives the updated error detection signal from the third processor 340. The updated error detection signal includes each operation performance consumed time recorded by each of the plurality of processors 320 to 340.

The error detection processor 310 determines whether the operation processing time of the plurality of processors 320 to 340 is processed within the operation request time based on the updated error detection signal. The operation processing time means that the operation performance consumed time of each of the plurality of processors 320 to 340 and the communication time from the error detection signal transmission time point to the updated error detection signal reception time point are added. In the shown example, the operation performance consumed time means "2+3+4", and the communication time means "1+5".

When the operation processing time is not processed within the operation request time, the error detection processor 310 increments the error counter by a predetermined value. When the error counter exceeds a predetermined threshold, the error detection processor 310 transmits an error occurrence signal to at least one that caused the error of the plurality of processors 320 to 340. The error occurrence signal includes a signal including a flag value indicating an error occurrence and a reset signal.

When the error detection system is a system in which operation speed is important and the operation processing time is not processed within the operation request time due to the operation performance consumed time, the error detection processor 310 increments the error counter by weighting the predetermined value.

When the error detection system is a system in which communication speed is important and the reason why the operation processing time is not processed within the operation request time is an error based on the communication time, the error detection processor 310 increments the error counter by weighting the predetermined value.

Figure 4:
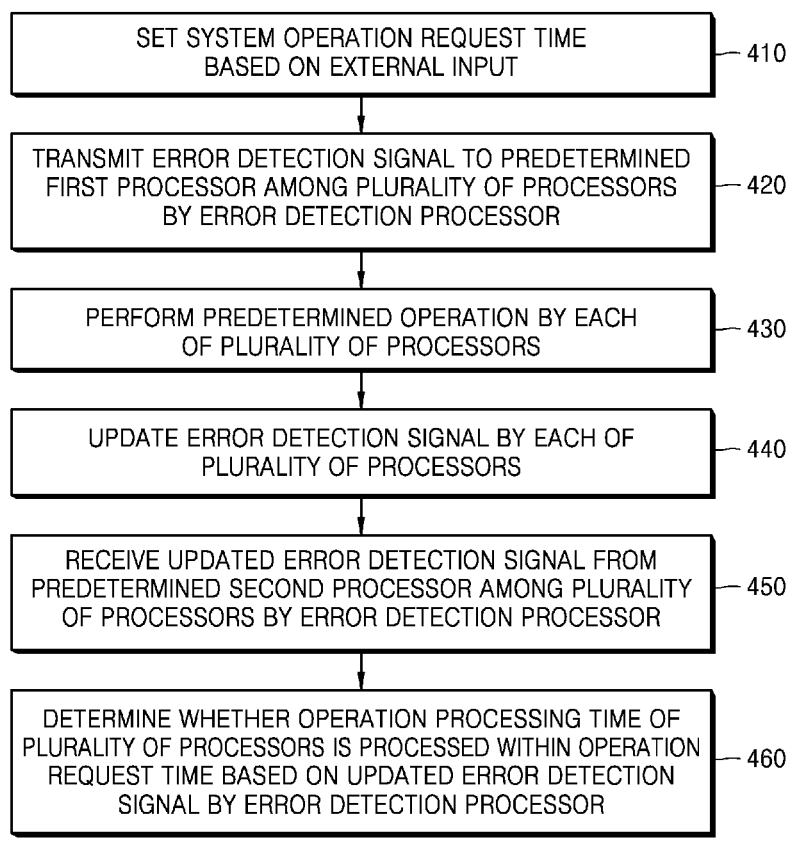
FIG. 4 is a flowchart of a multiple-processor error detection method according to an embodiment of the present invention.

FIG. 4 is a flowchart of a multiple-processor error detection method according to an embodiment of the present invention.

In step 410, the error detection system 200 sets the system operation request time based on the external input.

In step 420, the error detection system 200 transmits an error detection signal to a predetermined first processor among the plurality of processors by an error detection processor.

In step 430, the error detection system 200 performs a predetermined operation by each of the plurality of processors.

In step 440, the error detection system 200 updates the error detection signal to include the operation performance consumed time required to perform the predetermined operation by each of the plurality of processors. The operation performance consumed time is a value obtained by measuring a difference between a time point at which each of the plurality of processors starts to perform a predetermined operation and a time point at which the predetermined operation is completed.

In step 450, the error detection system 200 receives the updated error detection signal from a predetermined second processor among the plurality of processors by an error detection processor. The updated error detection signal includes the operation performance consumed time recorded by each of the plurality of processors.

In step 460, the error detection system 200 determines whether the operation processing time of the plurality of processors is processed within the operation request time based on the updated error detection signal by an error detection processor. The operation processing time means that the operation performance consumed time of each of the plurality of processors and the communication time from the error detection signal transmission time point to the updated error detection signal reception time point are added.

When the operation processing time is not processed within the operation request time, the error detection system 200 proceeds to step 520 and will be described later with reference to FIG. 5.

The plurality of processors and the error detection processors are interconnected by a bus.

Figure 5:
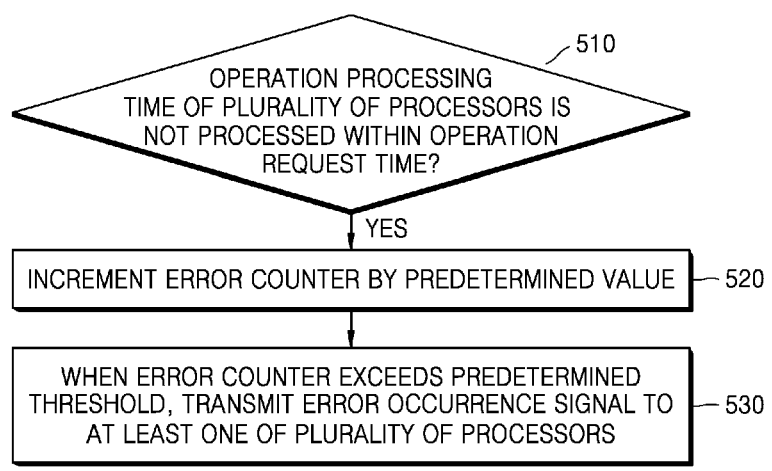
FIG. 5 is a flowchart of a multiple-processor error detection method according to an embodiment of the present invention.

FIG. 5 is a flowchart of a multiple-processor error detection method according to an embodiment of the present invention.

In step 520, the error detection system 200 increments the error counter by a predetermined value.

When the error detection system 200 is a system in which operation speed is important and the operation processing time is not processed within the operation request time due to the operation performance consumed time, the error detection system 200 increments the error counter by weighting the predetermined value.

When the error detection system 200 is a system in which communication speed is important and the reason why the operation processing time is not processed within the operation request time is an error based on the communication time, the error detection system 200 increments the error counter by weighting the predetermined value.

In step 530, when the error counter exceeds a predetermined threshold, the error detection system 200 transmits an error occurrence signal to at least one of the plurality of processors. The error occurrence signal includes a signal including a flag value indicating an error occurrence and a reset signal.

For example, a device according to an embodiment of the present invention may include a bus coupled to each unit of the device as shown in the drawing and at least one processor coupled to the bus, and may include a memory coupled to the bus to store commands, received messages, or generated messages, and coupled to at least one processor to perform the above-described commands.

According to the present invention, it is possible not only to identify a processing core in which a problem occurs in a multicore system, but also to identify whether the cause of the problem is an operation error or a communication error.

Therefore, the multi-core error detection device according to the present invention not only assures the safety of the operation of the system, but also improves the work performance for solving the identified problem.

Although the multiple-processor detection system and the method thereof have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. An error detection system comprising:
an input unit for setting a system operation request time based on an external input;
a plurality of processors for performing a predetermined operation; and
an error detection processor connected to each of the plurality of the processors and configured for detecting an error of each of the plurality of processors to generate an error detection signal,
wherein the error detection processor transmits the error detection signal to a predetermined first processor among the plurality of processors, the predetermined first processor updating the error detection signal received from the error detection processor to generate a first updated error detection signal and transmitting the first updated error detection signal to remaining processors among the plurality of processors,
wherein the error detection processor receives an updated error detection signal which is updated from the first updated error detection signal by a predetermined second processor which is one of the remaining processors among the plurality of processors, and
wherein the error detection processor determines whether an operation processing time of the plurality of processors is processed within the system operation request time based on the updated error detection signal.

2. The error detection system of claim 1, wherein when the operation processing time is not processed within the system operation request time, the error detection processor increments an error counter by a predetermined value and transmits an error occurrence signal to at least one of the plurality of processors when the error counter exceeds a predetermined threshold.

3. The error detection system of claim 2, wherein the operation processing time is a sum of a value obtained by assigning a predetermined weight to an operation performance consumed time of each of the plurality of processors and a communication time from an error detection signal transmission time point to an updated error detection signal reception time point.

4. The error detection system of claim 2, wherein the operation processing time is a sum of an operation performance consumed time of each of the plurality of processors and a value obtained by assigning a predetermined weight to a communication time from an error detection signal transmission time point to an updated error detection signal reception time point.

5. The error detection system of claim 2, wherein the error occurrence signal comprises a signal including a flag value indicating an error occurrence and a reset signal.

6. The error detection system of claim 2, wherein the operation processing time is a sum of an operation performance consumed time of each of the plurality of processors and a communication time from an error detection signal transmission time point to an updated error detection signal reception time point.

7. The error detection system of claim 6, wherein when the error is based on the operation performance consumed time, the error counter is a value obtained by weighting the predetermined value.

8. The error detection system of claim 6, wherein when the error is based on the communication time, the error counter is a value obtained by weighting the predetermined value.

9. The error detection system of claim 6, wherein the updated error detection signal comprises the operation performance consumed time recorded by each of the plurality of processors.

10. The error detection system of claim 9, wherein the operation performance consumed time is a value obtained by measuring a difference between a time point at which a predetermined operation is started in each of the plurality of processors and a time point at which the predetermined operation is completed.

11. An error detection method comprising:
setting, by an input device, a system operation request time based on an external input;
transmitting, by an error detection processor, an error detection signal to a predetermined first processor among a plurality of processors, wherein the error detection signal is generated by detecting an error of each of the plurality of processors via an error detection processor connected to each of the plurality of the processors, and wherein the predetermined first processor is configured to update the error detection signal received from the error detection processor to generate a first updated error detection signal and to transmit the first updated error detection signal to remaining processors of the plurality of processors,
performing, by each of the plurality of processors, a predetermined operation;
updating, by the remaining processors of the plurality of processors, the first updated error detection signal;
receiving, by the error detection processor, an updated error detection signal which is updated from the first updated error detection signal by a predetermined second processor which is one of the remaining processors among the plurality of processors; and
determining, by the error detection processor, whether an operation processing time of the plurality of processors is processed within the system operation request time based on the updated error detection signal.

12. The method of claim 11, further comprising:
when the operation processing time is not processed within the system operation request time, incrementing an error counter by a predetermined value; and
when the error counter exceeds a predetermined threshold, transmitting an error occurrence signal to at least one of the plurality of processors.

13. The method of claim 12, wherein the operation processing time is a sum of an operation performance consumed time of each of the plurality of processors and a communication time from an error detection signal transmission time point to an updated error detection signal reception time point.

14. The method of claim 13, wherein when the error is based on the operation performance consumed time, the error counter is a value obtained by weighting the predetermined value.

15. The method of claim 13, wherein when the error is based on the communication time, the error counter is a value obtained by weighting the predetermined value.

16. The method of claim 13, wherein the operation processing time is a sum of a value obtained by assigning a predetermined weight to an operation performance consumed time of each of the plurality of processors and a communication time from the error detection signal transmission time point to the updated error detection signal reception time point.

17. The method of claim 13, wherein the operation processing time is a sum of an operation performance consumed time of each of the plurality of processors and a value obtained by assigning a predetermined weight to a communication time from the error detection signal transmission time point to the updated error detection signal reception time point.

18. The method of claim 13, wherein the updated error detection signal comprises the operation performance consumed time recorded by each of the plurality of processors.

19. The method of claim 18, wherein the operation performance consumed time is a value obtained by measuring a difference between a time point at which a predetermined operation is started in each of the plurality of processors and a time point at which the predetermined operation is completed.

20. The method of claim 12, wherein the error occurrence signal comprises a signal including a flag value indicating an error occurrence and a reset signal.

* * * * *